United States Patent [19]

Speakman et al.

[11] Patent Number: 6,055,364
[45] Date of Patent: *Apr. 25, 2000

[54] CONTENT-BASED FILTERING OF MULTICAST INFORMATION

[75] Inventors: Tony Speakman, San Mateo; Alex G. Tweedly, Palo Alto; Steven Lin, Pleasanton; Dino Farinacci, San Jose, all of Calif.

[73] Assignee: Cisco Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/904,219

[22] Filed: Jul. 31, 1997

[51] Int. Cl.[7] .................................................. H04L 12/00
[52] U.S. Cl. .............................. 395/200.59; 395/200.53; 395/200.49; 395/200.61; 395/200.62; 395/200.75
[58] Field of Search ......................... 395/200.59, 200.53, 395/200.49, 200.61, 200.62, 200.75

[56] References Cited

U.S. PATENT DOCUMENTS

| | | | |
|---|---|---|---|
| 4,679,189 | 7/1987 | Olson et al. ............................. | 370/396 |
| 5,095,480 | 3/1992 | Fenner ..................................... | 370/238 |
| 5,208,811 | 5/1993 | Kashio et al. . | |
| 5,287,453 | 2/1994 | Roberts ................................... | 709/200 |
| 5,430,729 | 7/1995 | Rahnema . | |
| 5,477,541 | 12/1995 | White et al. . | |
| 5,490,140 | 2/1996 | Abensour et al. . | |
| 5,490,258 | 2/1996 | Fenner ..................................... | 711/1 |
| 5,539,734 | 7/1996 | Burwell et al. . | |
| 5,541,911 | 7/1996 | Nilakantan et al. . | |
| 5,546,370 | 8/1996 | Ishikawa . | |
| 5,600,798 | 2/1997 | Chenrukuri et al. . | |
| 5,630,125 | 5/1997 | Zellweger ............................... | 707/103 |
| 5,680,116 | 10/1997 | Hashimoto et al. . | |
| 5,684,797 | 11/1997 | Aznar et al. ............................. | 370/390 |
| 5,689,506 | 11/1997 | Chiussi et al. .......................... | 370/388 |
| 5,748,186 | 5/1998 | Raman .................................... | 345/302 |
| 5,802,054 | 9/1998 | Bellenger . | |
| 5,835,710 | 11/1998 | Nagami et al. . | |
| 5,856,981 | 1/1999 | Voelker . | |
| 5,903,559 | 5/1999 | Acharya et al. . | |

OTHER PUBLICATIONS

William Stallings, Data and Computer Communications, pp. 329–333, Prentice Hall, Upper Saddle River, New Jersey 07458.

*Primary Examiner*—Zarni Maung
*Assistant Examiner*—Saleh Najjar
*Attorney, Agent, or Firm*—Swernofsky Law Group

[57] ABSTRACT

The invention provides a method and system for content-based filtering of multicast information. A set of sources (S) which desire to distribute potentially large numbers of categories of differing information each associates a content descriptor (CD) with messages including information in those categories, so that a set of recipients (R) can receive information in at least some of those categories. A mapping server (M) associates a multicast address (MA) and a content mask (CM) with each content descriptor, so that network elements (N), such as routers, in the network can distribute only those messages which are of interest to recipients in multicast distribution trees for those multicast addresses. Each source generates content descriptors for each differentiable topic in a tree structured hierarchy, and obtains a multicast address and a content mask for the broadest content descriptor it is capable of distributing. Each recipient obtains the associated source, multicast address, and content mask, for each content descriptor of interest, and uses that information to join the multicast distribution tree for that information. Each network element between the source and the recipient determines what information it must forward for further distribution in response to the content descriptors, content masks, multicast addresses, and multicast distribution trees.

28 Claims, 2 Drawing Sheets

CONTENT-BASED FILTERING OF MULTICAST INFORMATION

BACKGROUND OF THE INVENTION

1. Field of the Invention

The invention relates to content-based filtering of multicast information.

2. Related Art

In a network of devices in which information is to be distributed to a large number of devices, it is known to transmit "multicast" messages, that is, messages which have multiple recipients and which are recognized by routers and routing protocols as intended to be delivered to multiple destinations. When information is to be delivered to a large number of recipients, it may be advantageous to use multicast techniques to deliver that information without incurring substantial additional overhead for administrative delivery requirements. Applications are known which use multicast techniques to deliver the same information to multiple recipients on a network, or on a network of networks such as an internet or an intranet. One known protocol, IGMP (Internet Group Management Protocol), uses a multicast address to distinguish between sets of recipients for multicast packets in an internet.

However, a problem has arisen in the art in the case when it is desired to deliver differing information to multiple recipients on a network. Because the information to be delivered is different for each recipient, or for each set of recipients in a specified interest group, there is a need to distinguish information by its content or subject matter, so that recipients which are interested in particular subjects can receive only that information of interest. However, when information is distinguished by content, the number of differing sets of information to be delivered can rapidly overwhelm any number of multicast addresses which can reasonably be reserved for differing sets of recipients.

Accordingly, it would be advantageous to provide a method and system for distributing potentially large numbers of categories of differing information to potentially large numbers of recipients with differing interests. This advantage is achieved in an embodiment of the invention in which a set of content descriptors for information are associated with a set of multicast addresses by a mapping server, and in which a set of sources and recipients associate themselves with those multicast addresses and their multicast distribution trees, so as to distribute information of interest to recipients broadly without duplication of effort and without excess use of multicast addresses.

SUMMARY OF INVENTION

The invention provides a method and system for content-based filtering of multicast information. A set of sources (S) which desire to distribute potentially large numbers of categories of differing information each associates a content descriptor (CD) with messages containing information in those categories, so that a set of recipients (R) can receive information in at least some of those categories. A mapping server (M) associates a multicast address (MA) and a content mask (CM) with each content descriptor, so that network elements (N), such as routers, in the network can distribute only those messages which are of interest to recipients in multicast distribution trees for those multicast addresses.

In a preferred embodiment, each source generates content descriptors for each differentiable category in a tree structured hierarchy, and obtains a multicast address and a content mask for the broadest content descriptor it is capable of distributing. Each recipient obtains the associated source, multicast address, and content mask, for each content descriptor of interest, and uses that information to join the multicast distribution tree for that information. Each network element between the source and the recipient determines what messages it must forward for further distribution in response to content descriptors, content masks, multicast addresses, and multicast distribution trees.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using general purpose switching processors or special purpose switching processors or other circuits adapted to particular process steps and data structures described herein, and that implementation of the process steps and data structures described herein would not require undue experimentation or further invention.

System Architecture

Figure 1:
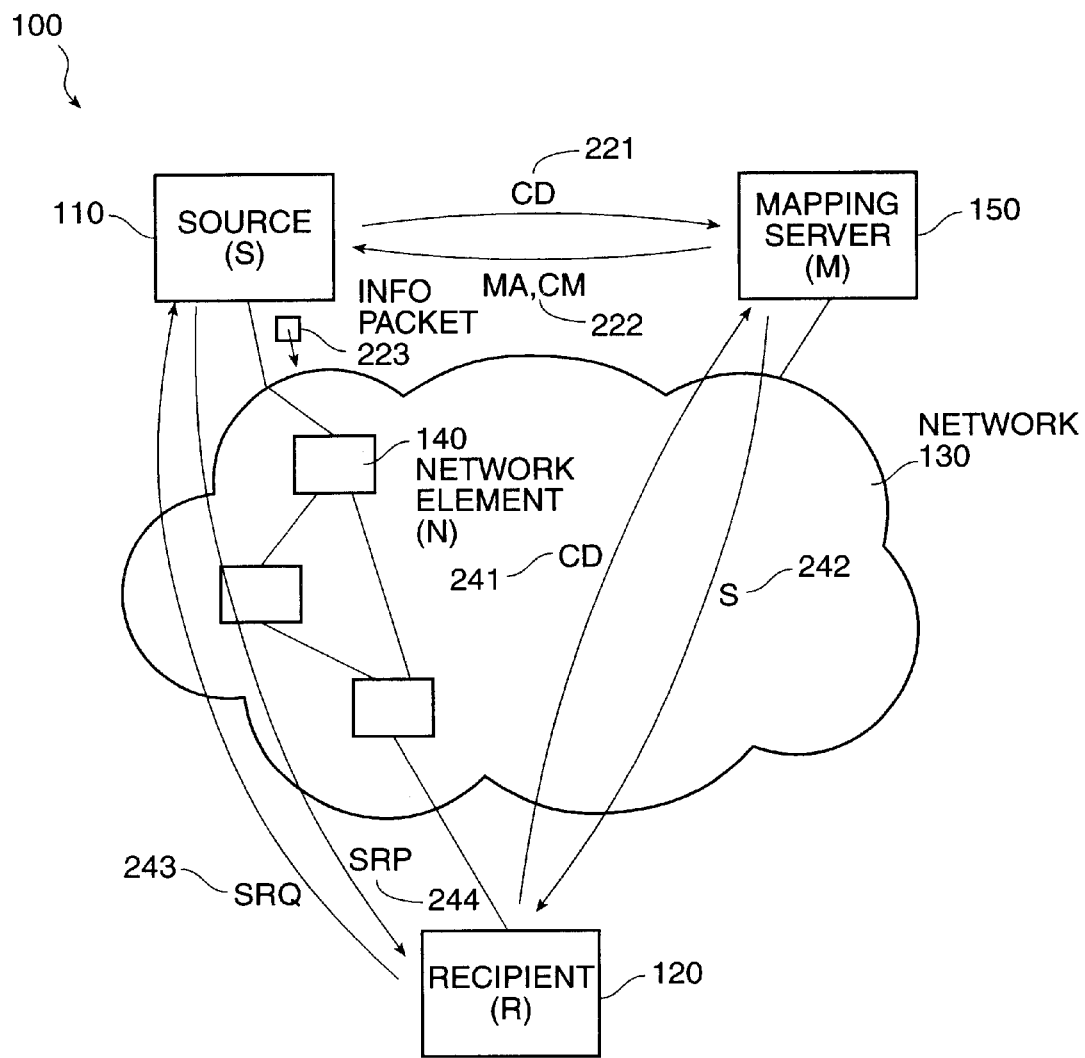
FIG. 1 shows a block diagram of a system for content-based filtering of multicast information.

FIG. 1 shows a block diagram of a system for content-based filtering of multicast information.

A system 100 for content-based filtering of multicast information includes a set of sources S 110 which desire to distribute potentially large numbers of categories of differing information, a set of recipients R 120 each of which can receive information in at least some of those categories, a network 130 for distributing messages, a set of network elements N 140 for forwarding and transmitting messages in the network 130, and a mapping server M 150 for associating multicast distribution trees with subsets of the categories of differing information.

Each of the sources S 110 comprises a device or set of devices coupled to the network 130, such as a general purpose processor operating under control of operating system and application software, and disposed to present information to the recipients R 120 in a number of differing categories, as described herein. In a preferred embodiment, one of the sources S 110 can comprise a Unix server for publishing information to the network 130 using application software.

Each of the recipients R 120 comprises a device or set of devices coupled to the network 130, such as a general purpose processor operating under control of operating system and application software, and disposed to receive information from the sources S 110 in a number of differing categories, as described herein. In a preferred embodiment, one of the recipients R 120 can comprise a PC workstation for receiving information from the network 130 using application software.

The network 130 includes a distribution medium and a set of protocols for information transfer using that distribution medium. In a preferred embodiment, the network 130 includes a network of networks such as an internet or an intranet.

Each of the network elements N 140 comprises a device or set of devices disposed to forward and transmit messages in the network. In a preferred embodiment, each of the network elements N 140 comprises a router made by cisco Systems, Inc., of San Jose, Calif.

The mapping server M 150 comprises a device or set of devices coupled to the network 130, such as a general purpose processor operating under control of operating system and application software, and disposed to associate multicast distribution protocol information with each content descriptor for information to be distributed by one or more sources S 110 to one or more recipients R 120, as described herein.

System Operation

Figure 2:
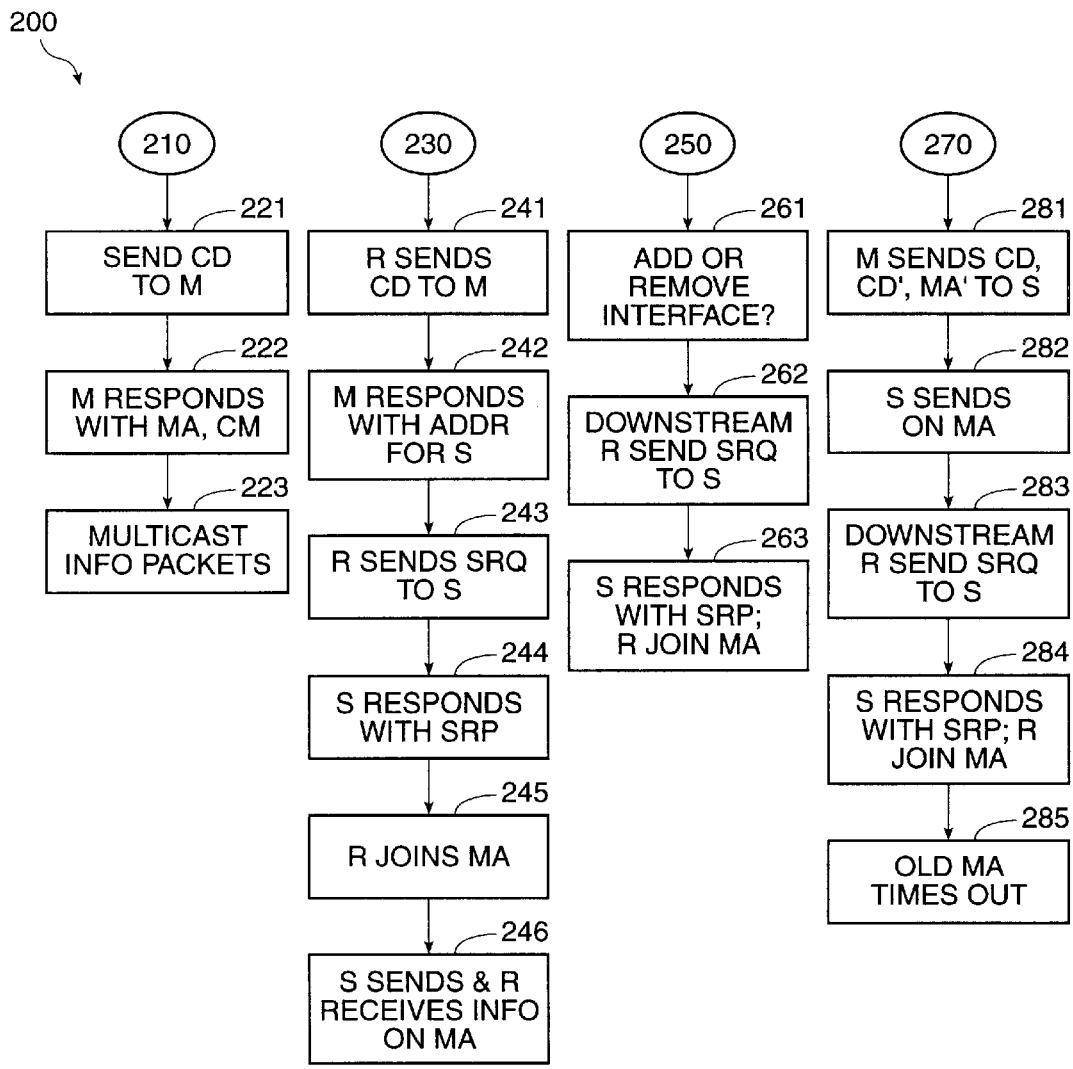
FIG. 2 shows a process flow diagram of a method of operating a system for content-based filtering of multicast information.

FIG. 2 shows a process flow diagram of a method of operating a system for content-based filtering of multicast information.

A method of operating the system 200 includes a set of flow points and process steps as described herein, and uses a set of protocol messages as described herein.

(1) Source Initialization

At a flow point 210, one of the sources S 110 desires to start distributing information in a selected category.

At a step 221, the source S 110 transmits a protocol message to the mapping server M 150, including a selected content descriptor CD. The content descriptor CD specifies the category of the information to be distributed.

In a preferred embodiment, the content descriptor CD includes a variable length, delimited text name, specifying a location in a tree structured hierarchy of subject matter. For example, the content descriptor CD could include the text string "science.astronomy.stars.novae", having a plurality of variable length words delimited by a delimiter character such as period, to indicate a topic (science), a subtopic (astronomy), a sub-subtopic (stars), and a particular subject (novae). There is no special requirement that the content descriptor CD must have four parts, or that any of the parts must be natural-language words. In the same example, other content descriptors CD could include related text strings, such as "science.astronomy.stars.nearby", "science.astronomy.planets", and "science.physics". In other fields, other content descriptors CD could include date ranges, stock symbols, telephone area codes or country codes, or other values having specific meaning to recipients R 120.

There is no particular requirement that the content descriptor CD is variable length or delimited text, so long as the content descriptor CD specifies a distinct category of subject matter which can be filtered at the recipient R 120. It is not strictly necessary, but it is preferred that the subject matter be organized in a hierarchy, so that distribution by the network elements N 140 can be tailored for efficient filtering and propagation of information.

In a first alternative embodiment, the content descriptor CD may include a fixed length value which comprises an encrypted or otherwise coded or hashed version of text strings such as those described herein. For example, the content descriptor CD may comprise a 32-bit hash code of text strings such as those described herein.

In a second alternative embodiment, the content descriptor CD may include a fixed length value which comprises an encrypted or otherwise coded or hashed version of a structured hierarchical value, which structured hierarchical value is itself fixed length or numerical in nature. For example, the content descriptor CD may comprise a 32-bit hash code of an address from an address space like IP version 4 but which is more than 32 bits, so as to achieve both a routing and filtering capability.

At a step 222, the mapping server M 150 transmits a responsive protocol message to the source S 110, including a content mask CM and a multicast address MA. The content mask CM specifies a dividing line between a more significant portion (MSP) and a less significant portion (LSP) of the content descriptor CD. The multicast address MA is suitable for use with a multicast distribution protocol, such as IGMP, and is uniquely associated with the more significant portion MSP of the content descriptor CD. IGMP is further described in the document IETF RFC 1112, hereby incorporated by reference as if fully set forth herein.

At a step 223, the source S 110 transmits multicast packets using IGMP. Each multicast packet includes the entire content descriptor CD, so that the recipients R 120 and the network elements N 140 can filter multicast packets for multicast distribution in response thereto. In IGMP, each multicast packet is transmitted using a multicast distribution tree, which is constructed and altered using protocol messages in which each of the recipients R 120 joins the multicast distribution tree.

(2) Recipient Initialization

At a flow point 230, one of the recipients R 120 desires to start receiving information in a selected category.

At a step 241, the recipient R 120 transmits a protocol message to the mapping server M 150, including a selected content descriptor CD. The content descriptor CD specifies the category of the information to be received.

At a step 242, the mapping server M 150 transmits a responsive protocol message to the recipient R 120, including an address for the source S 110 associated with that content descriptor CD. In a preferred embodiment, there can be multiple sources S 110, each providing information relating to a set of content descriptors CD.

At a step 243, the recipient R 120 transmits a protocol message SRQ ("subscription request") to the source S 110 (using the address for the source S 110 received from the mapping server M 150), including the selected content descriptor CD.

In a preferred embodiment, the protocol message SRQ is distinguished at a network protocol layer, so each network element N 140 in the path from the recipient R 120 to the source S 110 can respond to the protocol message SRQ in place of the source S 110. For example, one technique for so distinguishing the protocol message SRQ is the IP Router Alert Option. The IP Router Alert Option is further described in the document RFC 2113, hereby incorporated by reference as if fully set forth herein. In this manner, the protocol message SRQ is not required to be transmitted all the way back to the source S 110 if some network element N 140 along the way is able to respond.

Thus for example, if a particular recipient R 120 desired to obtain information having the content descriptor CD "science.astronomy.stars.novae", and a particular network element N 140 seeing the protocol message SRQ already had the information required for the responsive protocol message SRP of the step 244, that particular network element N 140 could respond in place of the source S 110 with the responsive protocol message SRP.

At a step 244, the source S 110 transmits a responsive protocol message SRP ("subscription response") to the recipient R 120, including the selected content descriptor CD, the associated content mask CM and the associated multicast address MA.

Each network element N 140 along the path the protocol message SRP takes from the source S 110 to the recipient R 120 adjusts its filtering so as to provide for transmission of the selected content from the source S 110 to the recipient R 120.

Thus for example, if the content descriptor CD included the text string "science.astronomy.stars.novae", each network element N 140 seeing the protocol message SRP would adjust its filtering so that information falling within that content descriptor CD is transmitted along the multicast distribution tree for the multicast address MA associated with that content descriptor CD to the recipient R 120. If a particular network element N 140 seeing the protocol message SRP is already transmitting (at its output interface to the recipient R 120) information having that content descriptor CD, or a superset thereof such as having the content descriptor CD "science.astronomy.stars", that particular network element N 140 does not make any adjustment to its filtering. In contrast, if a particular network element N 140 seeing the protocol message SRP is not already transmitting (at its output interface to the recipient R 120) information having that content descriptor CD, that particular network element N 140 adds that content descriptor CD to the information it provides at its output interface to the recipient R 120, so that the recipient R 120 can receive that information along the multicast distribution tree for the multicast address MA associated with that content descriptor CD.

At a step 245, the recipient R 120 transmits a protocol message using IGMP to join the multicast distribution tree associated with the multicast address MA.

At a step 246, the source S 110 multicasts information packets to the multicast address MA, so as to distribute the information to all of the recipients R 120 which have joined the multicast distribution tree. Each information packet includes the complete content descriptor CD.

As part of the operation of multicasting information packets to the multicast address MA, each network element N 140 in the multicast distribution tree receives multicast information packets. Each network element N 140 filters the packets it further transmits in the multicast distribution tree by comparing the content descriptor CD for each packet with a set of content descriptors CD which the network element N 140 is presently forwarding to at least one recipient R 120 on at least one of its output interfaces, and only further transmitting information packets in the multicast distribution tree on a particular output interface if at least one downstream recipient R 120 from that particular output interface has indicated that it desires to receive at least some information having one of the content descriptors CD within that particular multicast address MA.

(3) Changes to Routing Topology

At a flow point 250, one of the network elements N 140 notes a change in routing topology for the network 130. In a preferred embodiment, the network elements N 140 regularly exchange routing information which describes routing topology for the network 130, so that the network elements N 140 are regularly able to recognize and act upon such changes.

At a step 261, the network element N 140 which noted the change in routing topology determines if the change is to add or to remove an output interface. If the change is to remove an output interface, the network element N 140 discards its filters for that output interface. If the change is to add an output interface, the network element N 140 transmits a protocol message to each of the recipients R 120 downstream in the multicast distribution tree from that output interface; the protocol message informs each of the recipients R 120 that it should "resubscribe" to the content descriptors CD of interest to it.

At a step 262, each of the recipients R 120 downstream in the multicast distribution tree from that output interface for the network element N 140 transmits a protocol message SRQ to the source S 110, similar to the protocol message SRQ transmitted by the recipient R 120 to the source S 110 in the step 243. The protocol message SRQ of the step 262 is similar to the protocol message SRQ of the step 243, similarly includes the selected content descriptor CD and similarly is distinguished at the network protocol layer (such as using the IP Router Alert Option).

Each of the recipients R 120 periodically retransmits a new protocol message SRQ to the source S 110, similar to the protocol message SRQ in the step 262, such as every 30 seconds. In the event of transmission collisions, the amount of retransmit backoff is responsive to the length of the content descriptor CD. For example, in a preferred embodiment, the retransmit backoff for relatively short content descriptors CD (such as those less than about 16 bytes long) is less than about 10 milliseconds, the retransmit backoff for mid-length content descriptors CD (such as those between about 16 and about 64 bytes long) is between about 10 and about 100 milliseconds, and the retransmit backoff for relatively long content descriptors CD (such as those more than about 64 bytes long) is between about 100 and about 1,000 milliseconds. This allows all the relatively short content descriptors CD to be received by network elements N 140 before any of the mid-length content descriptors CD, and allows all the mid-length content descriptors CD to be received by network elements N 140 before any of the relatively long content descriptors CD.

At a step 263, the method 200 proceeds similarly to the step 244, the step 245, and the step 246. The source S 110 transmits a responsive protocol message SRP to the recipient R 120, including the selected content descriptor CD, the associated content mask CM and the associated multicast address MA. Each network element N 140 along the path the protocol message SRP takes from the source S 110 to the recipient R 120 adjusts its filtering so as to provide for transmission of the selected content from the source S 110 to the recipient R 120. The recipient R 120 uses IGMP to join the multicast distribution tree associated with the multicast address MA. The source S 110 multicasts information packets to the multicast address MA, so as to distribute the information to all of the recipients R 120 which have joined the multicast distribution tree.

(4) Changes to Distribution Hierarchy

At a flow point 270, the mapping server M 150 notes that it would be desirable to alter the usage of multicast addresses MA.

The mapping server M 150 can determine that there is relatively too much traffic for a particular multicast address MA, and thus desire to split that particular multicast address MA into two new multicast addresses MA1 and MA2. Alternatively, the mapping server M 150 can determine that there is relatively too little traffic for a pair of particular multicast addresses MA1 and MA2, and thus desire to aggregate those particular multicast addresses MA1 and MA2 into a new multicast address MA.

In either event, the mapping server M 150 determines that a particular content descriptor CD associated with a particular multicast address MA should be changed to be associated with a new multicast address MA'. In particular, either the old multicast address MA is lengthened to create the new multicast address MA' when two multicast addresses MA1 and MA2 are aggregated (so as to decrease the number of multicast addresses but increase the amount of filtering), or the old multicast address MA is shortened to create the new multicast address MA' when a particular multicast address MA is split into two multicast addresses MA1 and MA2 (so as to increase the number of multicast addresses but decrease the amount of filtering).

At a step 281, the mapping server M 150 transmits a protocol message to the source S 110, including the selected content descriptor CD, with a new associated content mask CM' and a new associated multicast address MA'.

At a step 282, the source S 110 transmits a protocol message using the old multicast address MA to all of the recipients R 120 which have joined the multicast distribution tree for the old multicast address MA.

At a step 283, each of the recipients R 120 downstream in the multicast distribution tree transmits a protocol message SRQ to the source S 110, similar to the protocol message SRQ transmitted by the recipient R 120 to the source S 110 in the step 243. The protocol message SRQ of the step 283 is similar to the protocol message SRQ of the step 243, and similarly includes the selected content descriptor CD and a "router alert" tag.

At a step 284, the method 200 proceeds similarly to the step 244, the step 245, and the step 246. The source S 110 transmits a responsive protocol message SRP to the recipient R 120, including the selected content descriptor CD, the associated content mask CM and the associated multicast address MA. Each network element N 140 along the path the protocol message SRP takes from the source S 110 to the recipient R 120 adjusts its filtering so as to provide for transmission of the selected content from the source S 110 to the recipient R 120. The recipient R 120 uses IGMP to join the multicast distribution tree associated with the new multicast address MA'. The source S 110 multicasts information packets to the new multicast address MA', so as to distribute the information to all of the recipients R 120 which have joined the multicast distribution tree.

At a step 285, the old multicast address MA remains unused for a period of time and eventually times out according to IGMP.

Although in a preferred embodiment the mapping server M 150 comprises a single device, in alternative embodiments the mapping server M 150 may comprise a plurality of cooperating devices, such as a hierarchy of such devices cooperating to perform the functions of the mapping server M 150 as described herein.

Alternative Embodiments

Although preferred embodiments are disclosed herein, many variations are possible which remain within the concept, scope, and spirit of the invention, and these variations would become clear to those skilled in the art after perusal of this application.

We claim:

1. A method for content-based filtering of multicast information, said method including the steps of
    associating a content descriptor with messages including information in a set of categories;
    associating a multicast address and a content mask with each said content descriptor; and
    in a multicast tree associated with at least one said multicast address, filtering said messages using said content descriptors so as to limit further distribution of said messages along said multicast tree.

2. A method as in claim 1, wherein said step of associating a content descriptor with messages is performed at a source for said messages.

3. A method as in claim 2, wherein each said source performs the steps of
    generating one said content descriptor for each differentiable topic in a tree structured hierarchy; and
    obtaining one said multicast address and one said content mask for a broadest content descriptor said source is capable of distributing.

4. A method as in claim 3, wherein said step of obtaining is performed using a protocol message from said source.

5. A method as in claim 1, wherein said set of categories has more than about one thousand categories.

6. A method as in claim 1, wherein said step of associating a multicast address and a content mask with each said content descriptor is performed at a mapping server in response to a request by a source for said messages.

7. A method as in claim 1, wherein said step of filtering said messages is performed at network elements in said multicast tree.

8. A method as in claim 7, wherein said network elements include routers in a network.

9. A method as in claim 7, wherein
    each said network element includes at least one output interface; and
    each said network element transmits to said output interface only those messages associated with a content descriptor for which there is at least one recipient associated with said content descriptor in the multicast tree for said output interface.

10. A method as in claim 9, wherein said recipient is associated with said content descriptor using a protocol message from said recipient.

11. A method as in claim 9, wherein
    said recipient is associated with said content descriptor using a protocol message from said recipient to said source; and
    said recipient associated with said content descriptor joins a multicast tree associated with said multicast address.

12. A method as in claim 1, wherein said content descriptors form a tree structured hierarchy.

13. A method as in claim 1, wherein a set of possible multicast addresses is relatively much smaller than a set of possible content descriptors.

14. A method as in claim 1, wherein said multicast tree includes at least one network element which does not perform said step of filtering said messages.

15. A method as in claim 1, including a step of altering said multicast tree in response to a change in a network topology.

16. A method as in claim 1, wherein
    said multicast tree includes at least one network element and a plurality of output interfaces for forwarding messages in said multicast tree; and
    said step of filtering causes each said message to be forwarded by said network element to less than all of said output interfaces.

17. A system for content-based filtering of multicast information, said system including
    a set of messages including information in a set of categories, each said message having a content descriptor associated therewith, each said content descriptor having a a multicast address and a content mask associated therewith; and
    a multicast tree associated with at least one said multicast address, said multicast tree including at least one network element capable of filtering said messages using said content descriptors so as to limit further distribution of said messages along said multicast tree.

18. A system as in claim 17, including at least one source for said set of messages, wherein content descriptors are associated with said messages at said source.

19. A system as in claim 18, wherein each said source includes means for generating one said content descriptor for each differentiable topic in a tree structured hierarchy; and means for obtaining one said multicast address and one said content mask for a broadest content descriptor said source is capable of distributing.

20. A system as in claim 17, including a mapping server for associating a multicast address and a content mask with each said content descriptor.

21. A system as in claim 17, including a protocol message from a source for said messages for associating a multicast address and a content mask with one said content descriptor.

22. A system as in claim 17, wherein said network elements include routers in a network.

23. A system as in claim 17, wherein each said network element includes at least one output interface; and each said network element transmits to said output interface only those messages associated with a content descriptor for which there is at least one recipient associated with said content descriptor in the multicast tree for said output interface.

24. A system as in claim 23, including a protocol message from said recipient for associating said recipient with said content descriptor.

25. A system as in claim 17, wherein said multicast tree includes at least one network element which does not perform said step of filtering said messages.

26. A system as in claim 17, including a protocol message for altering said multicast tree in response to a change in a network topology.

27. A system as in claim 17, wherein said content descriptors include numeric values responsive to a hierarchical set of fixed-length values.

28. A system as in claim 17, wherein said content descriptors include numeric values responsive to a set of variable-length values.

* * * * *